United States Patent Office 3,510,738
Patented May 5, 1970

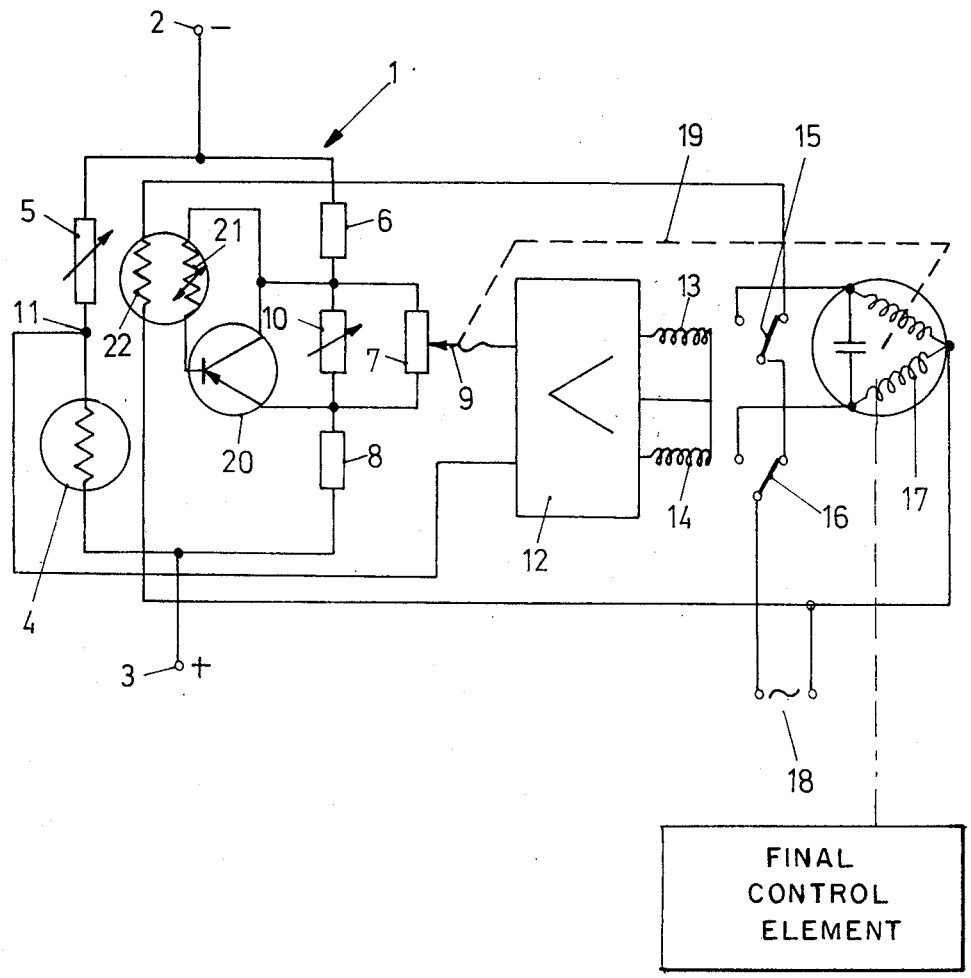

3,510,738
PROPORTIONAL CONTROLLER WITH NON-LINEAR PROPORTIONAL BAND WIDTH CONTROL
Kristian Iversen, Sonderborg, Denmark, assignor to Danfoss A/S, Nordborg, Denmark, a company of Denmark
Filed July 5, 1966, Ser. No. 562,745
Claims priority, application Germany, July 13, 1965,
D 47,719
Int. Cl. G05 6/02, 11/06
U.S. Cl. 318—18                                    9 Claims

ABSTRACT OF THE DISCLOSURE

A proportional controller controlling a final control element controlling a manipulated variable. A nonlinear proportional band width control establishes a proportional band width of operation of the final control element adjustably varying in time effective by increasing the proportional band in an "off" condition of actuating means actuating the final control element to maintain the proportional band width sufficiently wide to maintain the controller stable and decreasing the proportional band width at least incrementally when the actuating means is actuating the final control element.

---

This invention relates generally to automatic control and more particularly to a proportional controller.

Proportional-position action in controllers is well known. Proportional-position controllers have a serious limitation of "offset" in that they have an inability to return the controlled variable to its set point after a load change has caused a deviation. Moreover, simple proportional control has a limitation in that there is a change of control point with load. In order to eliminate some of the limitations of this type of controller, proportional-integral controllers are used. The integral action, however, results in decreased stability and dead control. Proportional controller adjustment is simply a matter of setting the proportional band wide enough for stability under abnormal as well as normal process conditions. Too narrow a band causes cycling; too wide; dead control.

It is a principal object of the present invention to provide a new and improved proportional controller which is highly stable and substantially eliminates the problem of offset.

A feature of the controller, in accordance with the invention, is the provision of means for gradually reducing the proportional band during intervals in which the final control element, of a control loop, is not being actuated by the controller and the band width is increased during the intervals in which the final control element is operating.

In accordance with the invention, a proportional controller for controlling a final control element manipulating a manipulated variable is provided. Automatic controller actuating means apply a control output to the final control element for manipulating the manipulated variable. Measuring means are connected in the controller to measure a controlled variable and means are provided to establish a set point of the controlled variable. It being understood that the set point is representative of a value obtaining when the manipulated variable has a selected value.

The controller comprises means to apply to the controller actuating means therein an actuating signal corresponding to a deviation of the controlled variable from the set point effective to cause the actuating means to cause the final control element to manipulate the manipulated variable to the selected value thereof. The improved controller of the invention comprises a proportional band width control means cooperative with the actuating and measuring means in the controller to establish a proportional band width of operation of the final element adjustably varying in time and effective to maintain the proportional band width sufficiently wide to maintain the controller stable and at least decreasing the proportional band width incrementally.

The new and improved controller provides simple proportional control with all its advantages while eliminating offset. The manipulated variable is controlled with stability and without dead control. Not until the final control element has found its rest position and an actuating signal to the controller is not applied is the band width of the proportional band gradually diminished. The diminishing or reducing of the band width reduces the offset. Once the manipulated variable changes sufficiently so that the controller is rendered effective again, that is, once the deviation from the selected value of the manipulated variable increases so that the controller operates during this control period, the proportional band is increased. During this interval the control element is being actuated and increasing of the band width thereby maintains stability of the controller. Since the narrowing of the proportional band width takes place during progressively diminishing intervals of time, the stability of the controller is unaffected and its porportional action characteristics are unaffected.

The new and improved controller comprises circuitry having a variable resistance means therein capable of varying in resistance in a direction for reducing the proportional band width during intervals in which the final control element is not being actuated for controlling the manipulated variable and other variable resistance means, namely a transistor, that increases the band width during operation of the final control element for maintaining stability of the controller.

Other features and advantages of the controller, in accordance with the present invention, will be better understood as described in the following specification and appended claims, in conjunction with the following drawing in which an electrical diagram of a controller provided with the invention is illustrated.

In accordance with the drawing, a shunt circuit 1 is provided with terminals 2, 3, for receiving a direct current voltage to establish a reference input. Measuring means, comprising a resistor 4 is provided for sensing a controlled variable, for example temperature, and is connected in series with a variable resistor 5 for establishing a set point of the controlled variable. Connected in parallel with these two resistors are provided a plurality of series resistors 6, 7 and 8. The resistor 7 is a voltage-dividing, feedback potentiometer having a movable contact 9. Connected in parallel with the potentiometer is connected a variable resistor 10 for setting the proportional band or throttling range of a final control element, for example a valve, not shown. The proportional band is, of course, the change of controlled variable necessary to move the final control element through its full stroke.

At junction 11, connections are made between the measuring means or measuring resistor 4 and the variable resistor 5 for taking off a voltage or signal to an amplifier 12 connected to the contact 9. The output of the amplifier is applied to operating coils 13, 14 of relay means having movable contacts 15, 16 associated with respective operating coils 13, 14. The contacts are normally in the position illustrated in the drawing when the final control element is not being actuated and are moved to fixed contacts for applying an alternating current to a split-phase, reversible induction motor 17 having, for example, a capacitance for starting. When the contacts 15, 16 are activated individually, in dependence upon the polarity of the voltage applied on the amplifier, the motor is connected to an alternating current power source at terminals 18. The motor 17 is thus reversibly driven in a direction for driving the final control element, for example a valve, manipulating the manipulated variable, for example flow of a medium, to which the control variable, for example temperature, is related.

It will be understood that when the manipulated variable being controlled by the final control element deviates from a selected value thereof the measuring resistor measures the deviation and the actuating signal is applied to the motor for bringing the manipulated variable back to the value selected therefor. As the motor rotates, a feed-back link 19 provides a feed-back input to the potentiometer contact 9 adjusting the potentiometer as required until the controlled variable, and therefore the manipulated variable, is brought to its selected value.

When the measuring means 4 senses a deviation in the manipulated variable, for example, a temperature change from a selected value, the adjusting movement of the motor 17 takes place within the proportional band set by the shunt switch circuit 1. The circuit switch 1 applies a signal to a correct one of the relay coils 13, 14 actuating the correct movable contacts of the relay means to a position in which the respective contact is moved to a position for applying an alternating voltage to the motor 17. As soon as the motor has caused the final control element to manipulate the manipulated variable to the selected level, it comes to a standstill and the contacts return to the position illustrated completing a circuit for varying the resistance of a transistor 20 and a variable resistor 21 by means of a heating resistor 22 placed in circuit with the power source 18.

The resistor 21 is connected to the transistor 20 and the potentiometer and receives a D.C. input from the direct current power source, not shown, through the terminals 2, 3 and has the characteristic of decreasing in resistance when heated. As the resistance of the temperature-dependent resistor 21 decreases, an increased base current flows through the transistor 21 and the internal resistance of the emitter-collector path of this transistor decreases. This results in a diminishing or reduction of the proportional band width of the proportional band during intervals in which the actuating signal is not being applied to the motor 17 for moving the final control element. This interval corresponds to the interval during which the final control element is at rest and substantially during which the manipulated variable has not deviated enough from its selected value to cause the controller to effect its corrective action.

It will be remembered that as soon as the difference between the actual manipulated variable and the selected variable exists and the deviation is sufficient, the motor 17 is again energized when one of the relay coils 13, 14 is reactivated. When the motor starts working again, the resistor 22 is deenergized so that the variable resistor 21 cools somewhat and thereby increases the band width until conformity is obtained between the existing value of the manipulated variable and its selected value. This motor operation is repeated several times until the band width is quite narrow and the offset or deviation is substantially negligible.

In the state of equilibrium, when the motor 17 is in an "off" condition, the variable resistor 21 may reach an end-temperature under control of the heating resistor 22. This end-temperature is representative of the narrowest proportional band width. If now the measuring device 4 senses a temperature deviation, the motor 17 begins to operate. During the period of operation of the motor, the temperature-dependent resistor 21 cools. The cooling is more intense the longer the motor 17 operates. Consequently, the band width of the proportional band extends or widens more the longer the motor 17 operates. That is to say, the larger the temperature deviation measured by the measuring means 4 is the greater the band width is widened. This condition maintains the stability of the controller and the sensitivity thereof so that the controller is optimally adapted to control manipulated variable or load changes.

While a preferred embodiment of the invention has been shown and described, it will be understood that many modifications and changes can be made within the true spirit and scope of the invention.

What I claim and desire to secure by letters patent is:

1. In a proportional controller for controlling a final control element manipulating a manipulated variable, automatic actuating means applying a control output to said final control element for manipulating said variable, measuring means measuring a controlled variable, means to establish a set point of said controlled variable, said set point being representative of a value obtaining when said manipulated variable has a selected value, means under control of said measuring means to apply to said actuating means an actuating signal corresponding to a deviation of said controlled variable from said set point effective to cause said actuating means to cause said final control element to manipulate said manipulated variable to said selected value, and nonlinear proportional band width control means connected in said controller cooperative with said actuating means and said measuring means to establish a proportional band width of operation of said final control element adjustably varying in time effective by increasing said proportional band when said actuating means is not actuating said final control element to maintain said proportional band width sufficiently wide to maintain said controller stable and decreasing said proportional band width at least incrementally when said actuating means is actuating said final control element.

2. In a proportional controller according to claim 1, in which said nonlinear proportional band width control means comprises means to decrease said proportional band width during intervals in which said manipulated variable is substantially at said selected value and said final element is thereby at rest and not manipulating said manipulated variable.

3. In a proportional controller according to claim 2, in which said nonlinear proportional band width control means comprises means to increase the band width proportionately to the time said final control element is manipulating said manipulated variable.

4. In a proportional controller according to claim 2, in which said nonlinear proportional band width control means compises means to nonlinearly increase said band width during the time said output is applied to said final control element.

5. In a proportional controller according to claim 1, in which said nonlinear proportional band width con-means comprises an electrically energized circuit having a variable resistance means effective automatically to alter said proportional band width in a direction decreasing said proportional band width incrementally proportionally to and during an interval of application of said output to said final control element to narrow said proportional band and offset corresponding to a deviation between said selected value of said manipulated variable and a value of said manipulated value established by said final control means and effective to increase the proportional band width during intervals of nonapplication of said control output to said final control element to maintain said controller substantially stable.

6. In a proportional controller according to claim 5, in which said variable resistance means comprises a resistor in said circuit having the characteristic of reducing in resistance when heated, heating means heating said resistor during said intervals of non-application of said output to said final control element.

7. In a proportional controller according to claim 6, including a feed-back potentiometer in said circuit in parallel with said resistor.

8. In a proportional controller according to claim 6, in which said variable resistance means comprise a transistor connected effective to decrease in internal resistance when said control output is applied to said final control element.

9. In a proportional controller according to claim 6, in which said actuating means comprises a split-phase, reversible induction motor, means to apply an alternating current to said motor, said proportional band width control means comprising means under control of said measuring means to connect the last-mentioned means to said motor and to said heating means alternately.

References Cited

UNITED STATES PATENTS

| | | | |
|---|---|---|---|
| 2,663,832 | 12/1953 | McDonald et al. | 318—29 XR |
| 2,694,169 | 11/1954 | Ehret | 318—29 |
| 3,391,315 | 7/1968 | Schwartzenberg | 318—448 XR |
| 3,391,316 | 7/1968 | Ross | 318—18 |

BENJAMIN DOBECK, Primary Examiner

U.S. Cl. X.R.

318—28